United States Patent
Hammer (10) Patent No.: US 6,783,074 B1
(45) Date of Patent: Aug. 31, 2004

(54) METHODS AND APPARATUS FOR EFFICIENT USE OF SPACE IN ARRANGING AND CONFIGURING OPTICAL COMPONENTS OF BAR CODE SCANNERS

(75) Inventor: Steven Joel Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/289,926

(22) Filed: Nov. 7, 2002

(51) Int. Cl.[7] ............................................ G06K 7/10
(52) U.S. Cl. ................................. 235/462.4; 359/216
(58) Field of Search ....................... 235/462.38–462.4; 359/211, 216–219; 250/234–236

(56) References Cited

U.S. PATENT DOCUMENTS

| | | | | |
|---|---|---|---|---|
| 4,487,473 A | * | 12/1984 | Hatch et al. | 359/351 |
| 4,938,551 A | * | 7/1990 | Matsumoto | 359/216 |
| 4,967,076 A | * | 10/1990 | Schuhmacher et al. | 250/236 |
| 5,268,565 A | * | 12/1993 | Katoh et al. | 235/462.31 |
| 5,343,029 A | * | 8/1994 | Katoh et al. | 235/462.39 |
| 5,574,592 A | * | 11/1996 | Sano et al. | 359/211 |

* cited by examiner

Primary Examiner—Karl D. Frech
Assistant Examiner—Jamara A Franklin
(74) Attorney, Agent, or Firm—Priest & Goldstein, PLLC; Paul W. Martin (57) ABSTRACT

Techniques for arrangement of components in a bar code scanner so as to make efficient use of space are described. A scanner includes a single scan window, a laser source for producing a laser beam, a rotating optical spinner to reflect the laser beam to produce a scan beam and a collection of fixed mirrors to reflect the scan beam in order to give it a desired optical length and to direct it out of the scan window. In order to make efficient use of space within the scanner, the spinner comprises a multifaceted hollow reflector, and a collector mirror is placed within a volume bounded by the reflector. The space made available by placement of the collector within the volume bounded by the collector makes it possible to arrange the collection of fixed mirrors such that the scan beam experiences at least three reflections after leaving the spinner.

10 Claims, 10 Drawing Sheets

METHODS AND APPARATUS FOR EFFICIENT USE OF SPACE IN ARRANGING AND CONFIGURING OPTICAL COMPONENTS OF BAR CODE SCANNERS

FIELD OF THE INVENTION

The present invention relates generally to improvements to bar code scanners. More particularly, the invention relates to advantageous techniques for designing and arranging optical components within a scanner so as to make efficient use of space and the use of space to arrange components so as to generate scan beams having a relatively long optical path length given space constraints imposed by a desired size for a scanner.

BACKGROUND OF THE INVENTION

Detecting and decoding of bar codes by a bar code scanner is accomplished by detection of light reflected into the bar code scanner as a scan pattern strikes and is reflected from the bar code. The scan pattern typically comprises a plurality of scan lines,.with each scan line being traced out by the motion of a scan beam emitted from the scanner. The scan beam is typically generated by a reflection of a laser beam from a facet of a rotating spinner. After the initial reflection from the spinner, the scan beam is directed to and reflected from each mirror in a succession of fixed mirrors in order to give the scan beam a desired optical path length and to direct the scan beam through a scan window. As the spinner rotates, the laser beam experiences a relative motion across each facet of the spinner. The movement of the laser beam across each spinner facet causes the scan beam to move so as to trace out a scan line. The length of each scan line is related to the optical path length of the scan beam, and the total length of all scan lines produced by a revolution of the spinner increases as the optical path length of the scan beams increases.

The performance of a bar code scanner, that is, the efficiency and accuracy of detection and decoding of bar codes, improves as total scan line length increases. A longer total scan line length provides a greater amount of light per unit of surface area when scan lines strike a surface, and also provides a greater area of coverage. It is therefore highly desirable to generate scan beams having optical path lengths that are as long as possible given the physical and other constraints imposed by the design of the scanner, so that a long total scan line length can be produced.

Many popular scanner implementations impose relatively stringent size constraints on a scanner. Single window scanners, for example, arc typically relatively small, with an extremely popular and widely used size for single window scanners being approximately 6 by 6 by 3 inches. Repeated reflection of the scan beam by a sequence of fixed mirrors increases the optical length of the scan beam. However, the components required to generate, detect and process a scan pattern limit the space available for fixed mirrors and for travel of the scan beam. In a relatively small single window scanner employing prior art techniques, the scan beam typically experiences no more than two reflections after leaving the spinner and before arriving at the scan window. Increasing the number of reflections experienced by the scan beam, and providing unobstructed paths between reflections, would significantly increase the effective length of the scan beam. There exists, therefore, a need for a single window scanner having components designed and arranged so as to produce relatively long scan beams within the space constraints imposed by a relatively small size for the scanner. The space constraints imposed by the need to conform a scanner to a particular set of external dimensions, coupled with the space requirements imposed by prior art design techniques, present additional limitations that could be overcome by more efficient use of space in scanner design.

SUMMARY OF THE INVENTION

The present invention provides for efficient use of space within the scanner by employing a design for the rotating spinner within the scanner such that open space is available within the volume bounded by the spinner, and disposing a fixed mirror in the open space bounded by the spinner. The spinner includes a polygonal reflector, having reflective interior surfaces and being hollow and open at the top, and a motor to rotate the reflector. The collector mirror, used to deflect a laser beam to a facet of the spinner as well as to collect and focus diffuse light entering the scanner, is supported from a sidewall of the scanner and suspended within the space bounded by the hollow reflector. The placement of the collector mirror within the volume bounded by the reflector avoids the necessity of placing the mirror elsewhere within the scanner and makes space available for placement of other components within the scanner.

The placement of the collector mirror within the space bounded by the spinner makes it possible to implement arrangements of fixed mirrors within the scanner so as to provide a relatively long optical path for scan beams reflected from the spinner. In one preferred embodiment, a collection of fixed mirrors is designed and arranged within the scanner so that a scan beam produced by a reflection of the laser beam from the spinner reflector is directed along a path involving three or more changes of direction due to reflection. With unobstructed space for travel between reflections, the scan beam can be directed so as to travel through a longer total path than would normally be traveled by a scan beam that was reflected two or fewer times within the space constraints imposed by prior art designs. Because the scan beams are longer, the total length of the scan lines produced by the tracing out of the scan beams through a rotation of the spinner is longer.

The use of space within the volume enclosed by the spinner also allows alternative arrangements of components. For example, additional electronic components may be placed in the scanner that could not be easily included without the additional space. As another example, configurations of mirrors may be designed that allow the generation of scan beams emerging from the scanner at different angles than would be possible if the additional space were not available.

A more complete understanding of the present invention, as well as further features and advantages of the invention, will be apparent from the following Detailed Description and the accompanying drawings.

DETAILED DESCRIPTION

Figure 1:
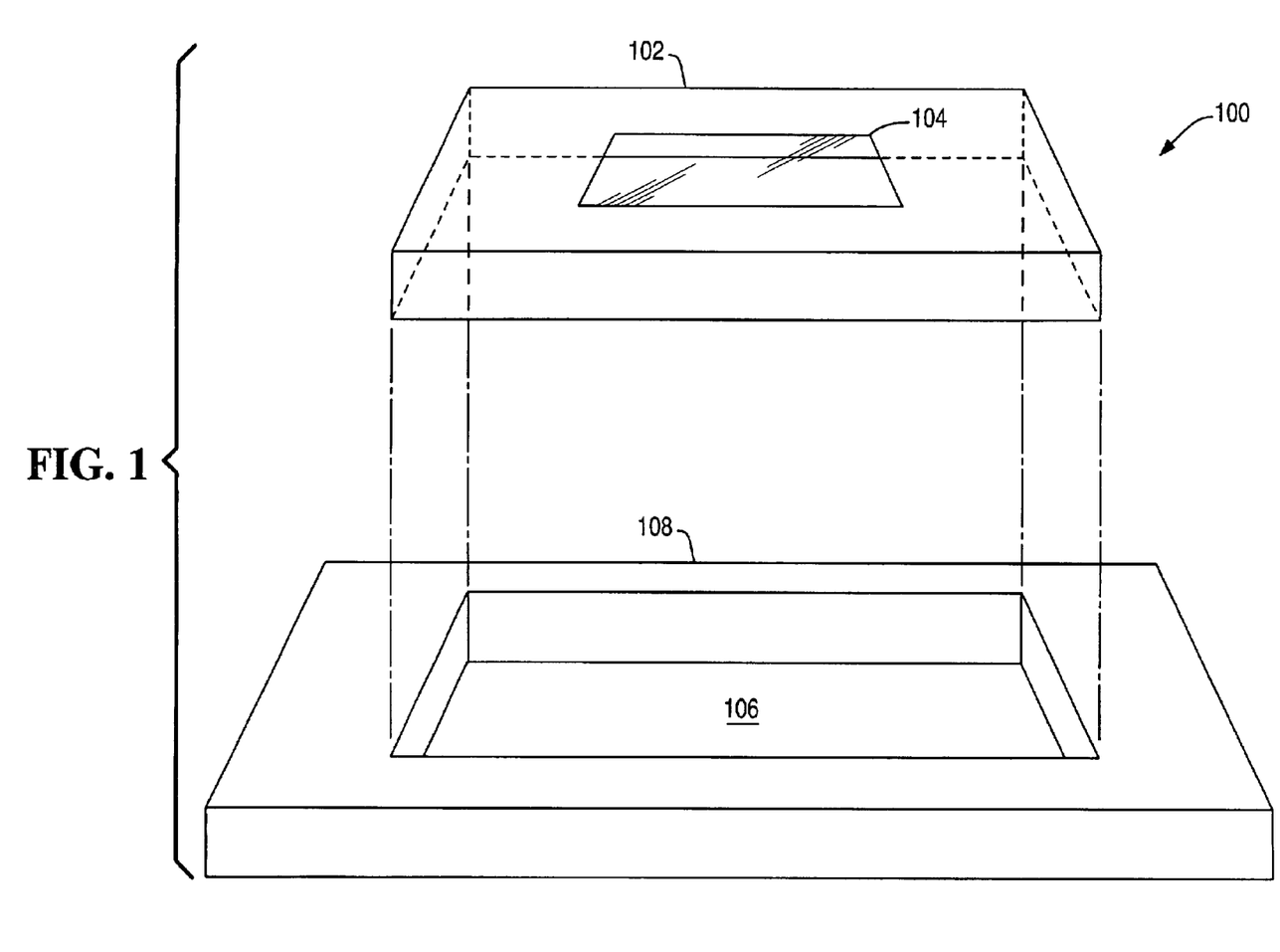
FIG. 1 illustrates a scanner assembly including a single window scanner that may advantageously employ the teachings of the present invention.

FIG. 1 illustrates a scanner assembly 100 employing a single window scanner 102 that may suitably employ the teachings of the present invention. The scanner 102 includes a scan window 104 from which a scan pattern may emerge and into which reflected light from a bar code may reenter the scanner. The length and width of the scanner 102 may suitably be approximately 6.5 inches and the depth of the scanner 102 may suitably be approximately 3 inches. The internal volume of the scanner 102 is limited by the need for the scanner 102 to fit within a receptacle 104 in a surface 106. The surface 106 may suitably be part of a countertop used in a point of sale terminal, and the receptacle 104 may be sized so as to accommodate commonly used single window scanners. Typically, a retailer will have in place a number of point of sale stations including countertops with receptacles such as the receptacle 104. If a retailer wishes to replace or upgrade existing scanners, he or she is likely to prefer to purchase scanners sized to fit within the receptacles already present in existing point of sale stations.

Figure 2:
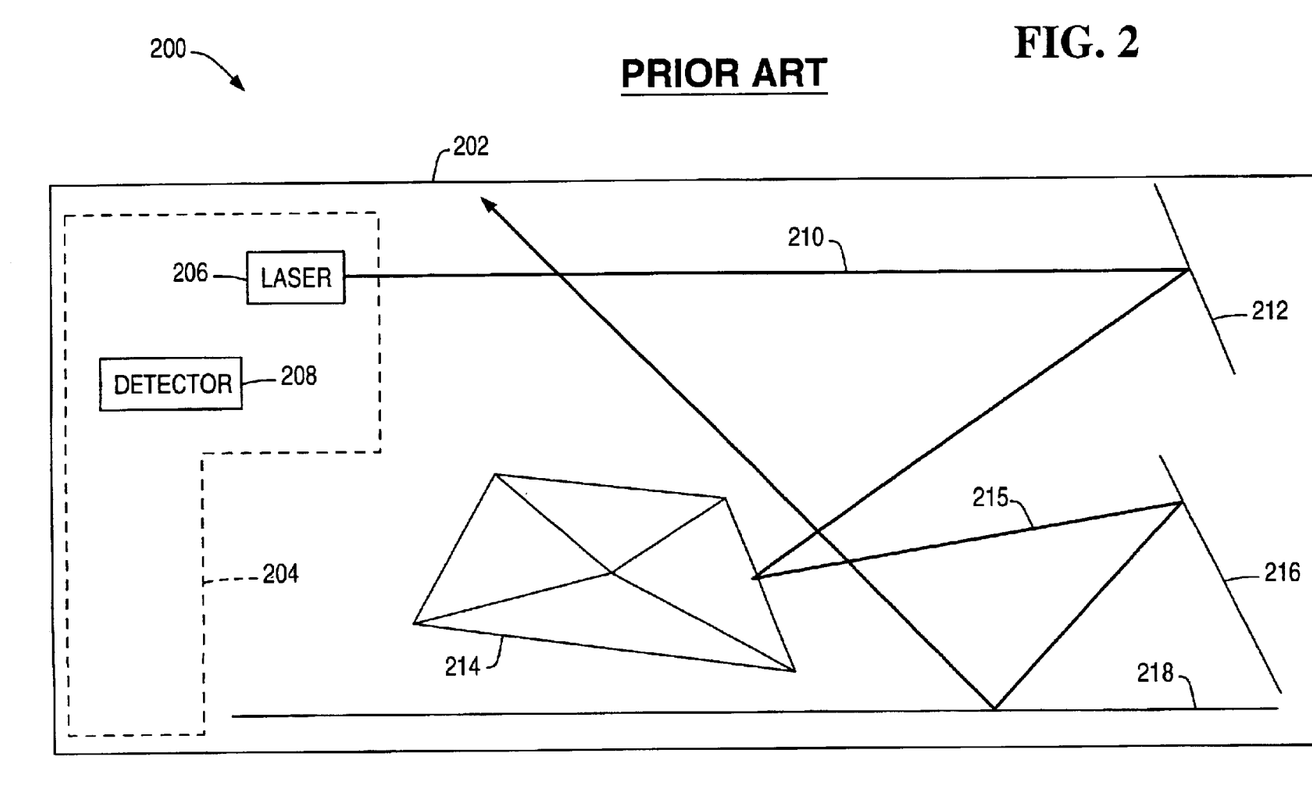
FIG. 2 illustrates an internal view of a prior art single window scanner.

FIG. 2 illustrates internal features of an exemplary prior art scanner 200. The scanner 200 includes a scan window 202 and a scanner electronics package 204 including a laser 206 and a detector 208. The laser 206 emits a laser beam 210. The laser beam 210 is directed toward a collector mirror 212, which deflects the laser beam 210 so that the beam 210 strikes a rotating spinner 214. In addition to deflecting the laser beam 210 to the spinner 214, the collector 212 collects diffuse reflected light generated from the reflection of a scan pattern from a bar code and reflected into the scanner 200. The collector 212 focuses the collected light to the detector 208, which produces a scanner signal based on the collected light.

When the laser beam 210 strikes the spinner 214, the laser beam produces a set of scan beams that are directed to and reflected from each of a series of fixed mirrors to the scan window 202. The motion of the spinner 214 causes each scan beam to move along the scan window 202 to trace out a scan line. A representative scan beam 215 is visible here, showing the path of the scan beam 215 through the series of mirrors to the scan window 202.

The series of fixed mirrors defines an optical path for the scan beam 215 that gives the scan beam 215 an optical length defined by the total distance traveled by the scan beam 215 from its reflection from the spinner 214 to its emergence from the scan window 202. The fixed mirrors increase the path length of the scan beam 210 significantly over the length that would be achieved if the scan beam 210 traveled directly from the spinner 214 to the window 202. In the present case, the fixed mirrors include a secondary mirror 216 and a floor mirror 218.

It can be seen that space may be at a premium within the scanner 200. In one popular application, the scanner 200 preferably conforms to the relatively small dimensions of popular and widely used single window scanners. A small size for the scanner 200 constrains the distance traveled by the scan beam 215 between reflections, and the constraints on the space within the scanner 200 limit the number of mirrors that can be placed within the scanner 200 and thus limit the number of reflections that can be experienced by the scan beam 215 along its path from the spinner 214 to the scan window 202.

Figure 3:
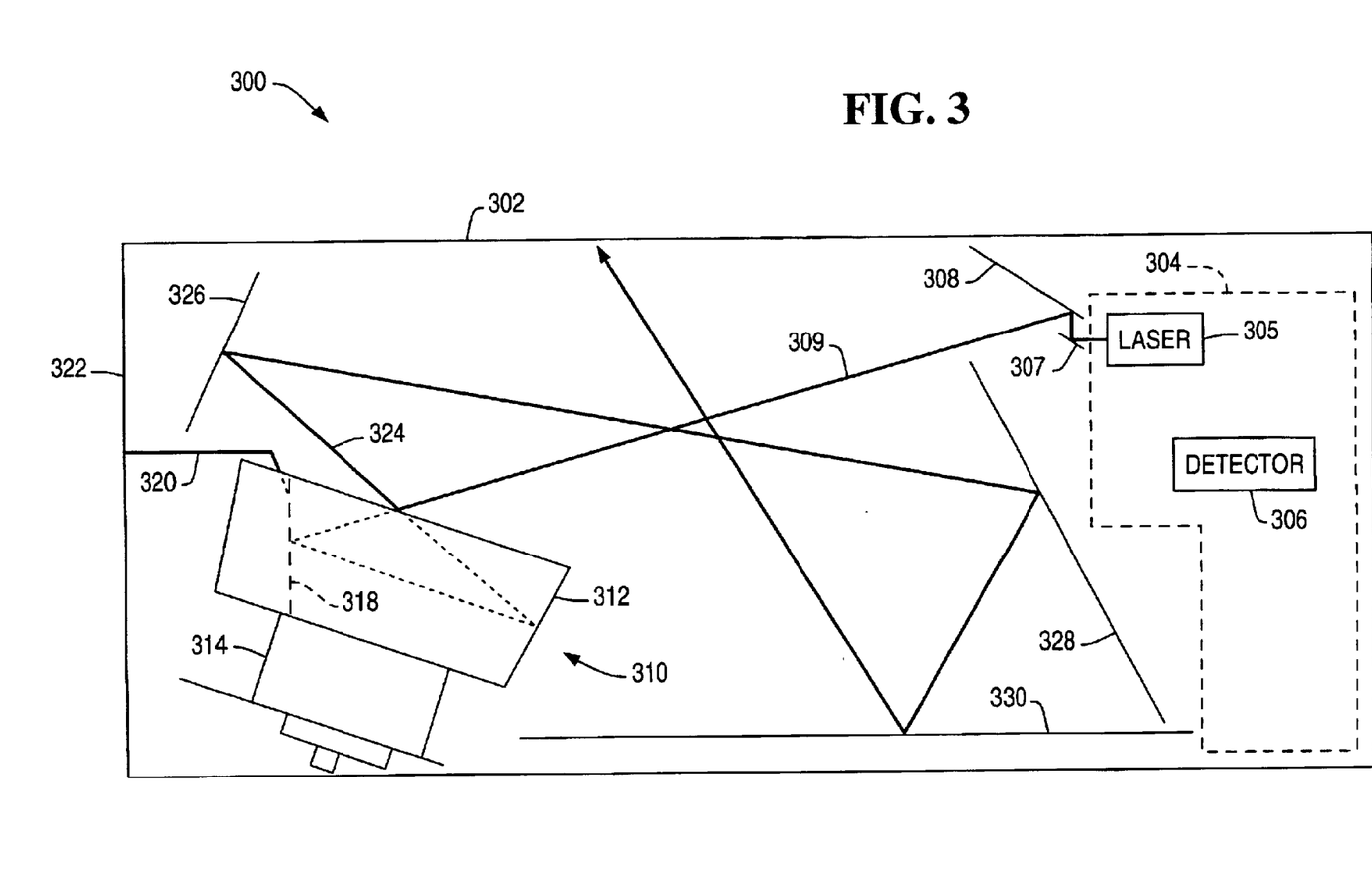
FIG. 3 illustrates an internal view of a single window scanner employing techniques for efficient use of space according to the present invention.

FIG. 3 illustrates an internal view of a bar code scanner 300 according to an aspect of the present invention. The scanner 300 includes a scanner window 302, a scanner electronics package 304 including a laser 305 and a detector 306. In the present illustration, the scanner also includes a first and second deflecting mirror 307 and 308, respectively, to direct a laser beam 309 to a spinner 310. It will be recognized that the deflecting mirrors 307 and 308 are not required and that the laser 305 may be positioned and directed so as to direct the laser beam 309 directly at the spinner 310 or that other arrangements of deflecting mirrors may be employed as a matter of design choice.

The spinner 310 comprises a hollow, polygonal reflector 312 having reflective inside surfaces. The polygonal reflector 312 is attached to a spinner motor 314, which rotates at a very high rate of speed.

The reflector 312 is open at the top, so that a laser beam 309 emitted by the laser 305 can enter the reflector 312 and be reflected by reflective facets inside the reflector 312. The design of the reflector 312 so that it is open provides space so that a collector mirror 318 may be positioned within the reflector 312. The collector mirror 318 is not attached to the polygonal reflector 312 or to any other part of the spinner 310, but instead is held in place by an arm 320 extending from a sidewall 322 of the scanner 300.

The collector mirror 318 does not move with the spinner 310, but remains in a fixed position chosen to reflect the laser beam 309, as well as diffuse light entering the scanner as a result of a reflection of a scan pattern from a bar code. As will be seen in subsequent figures and discussed further below, the collector mirror has two elements, a flat element for reflection of the laser beam 309 and an ellipsoidal element for collection and focusing of diffuse light entering the scanner 300.

The collector mirror 318 serves to capture the laser beam 309 as it is directed toward the spinner 310 and to deflect it to the reflector 312. The laser beam 309 is reflected from the reflector 312 to form a set of scan beams that travel through a path defined by a series of fixed mirrors chosen to give each scan beam a desired optical length and to direct the scan beam out of the scan window 302. A representative scan beam 324 is shown here, resulting from the reflection of the laser beam 309 from a single facet of the reflector 312. The scan beam 324 moves as a result of the motion of the spinner to trace out a scan line. In addition, as will be seen in subsequent drawings and discussed below, the scanner 300 includes additional fixed mirrors adjacent to those shown and oriented at different angles, so that the relative movement of the laser beam 309 across one facet of the reflector 312 will cause the scan beam 324 to move from one fixed mirror to an adjacent fixed mirror. As a result, the scan beam 324 first strikes one fixed mirror and is then reflected through a series of fixed mirrors in order to create a scan line as the scan beam 324 traces a path along the first fixed mirror. Subsequently, as a result of further relative movement of the scan beam 324 across a facet of the reflector 312, the scan beam 324 moves to a new fixed mirror adjacent to the first fixed mirror. This new fixed mirror is the first in a new series of fixed mirrors guiding the scan beam 324 through a new path, causing the generation of a new scan line from the same scan beam 324.

The laser beam 309 is reflected from the inside surface of the reflector 312 to the first in a series of fixed mirrors. The fixed mirrors guide the laser beam 309 through a series of reflections in order to give it a desired optical path length. Visible in the present illustration are individual mirrors belonging to a set of secondary mirrors 326 and a set of center mirrors 328, as well as a floor mirror 330. Individual mirrors of the sets of mirrors 326 and 328 are shown more clearly in FIG. 6 and are discussed in connection therewith.

The scan beam is emitted from the scan window, and moves as the spinner 310 moves in order to trace out scan lines. If one or more scan lines strike an object such as a bar code, light will be reflected from the object and a portion of the light will reenter the scanner 300 through the scan window 302. Some of this light will be captured by and reflected from the collector 318 and will strike the detector 306, which will produce a scanner signal based on the detected light. The scanner signal will be processed by other components (not shown) within the scanner electronics package 304 in order to extract bar code information.

The sets of fixed mirrors 326 and 328, and the mirror 330, are designed and arranged to give the scan beam 324 a greater length than is typically achieved using a prior-art single window scanner such as the scanner 200 of FIG. 2. The length of a scan line produced by the motion of a scan beam is dependent on the total optical length of the scan beam, without regard for changes in direction. Increasing the length of the scan beam 324 over that achievable using prior art techniques yields longer scan lines and is highly desirable if it can be achieved within the constraints imposed by the desired size and components of the scanner.

Figure 4A:
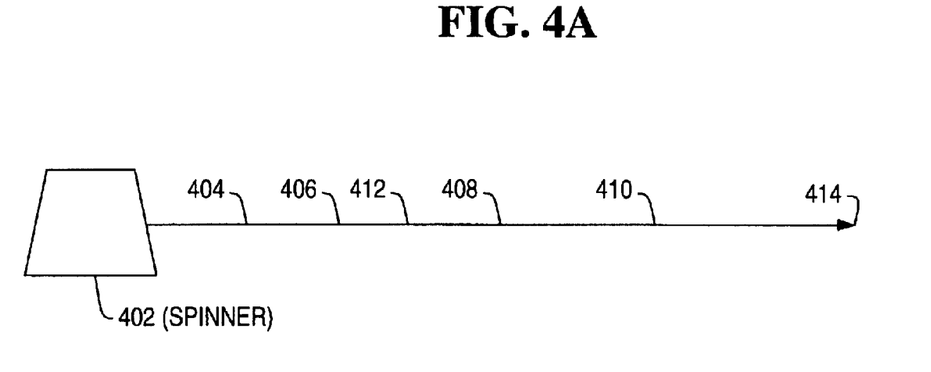
FIGS. 4A and 4B illustrate a scan beam reflected from a spinner and the dependence of length of scan lines produced by motion of the scan beam on the optical path length of the scan beam.
Figure 4B:
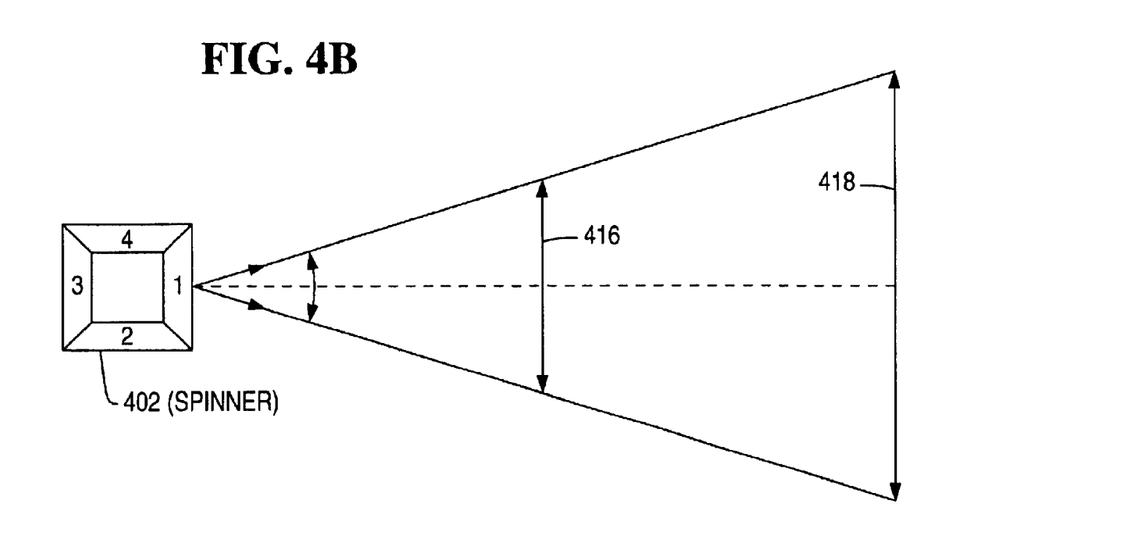
Figure 5A:
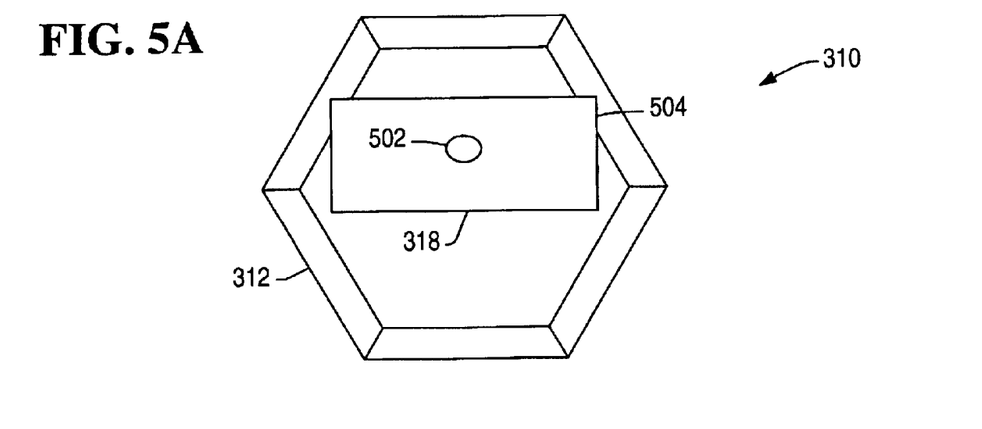
FIGS. 5A–5F illustrate a variety of views of a spinner employing techniques for the efficient use of space according to the present invention.
Figure 5B:
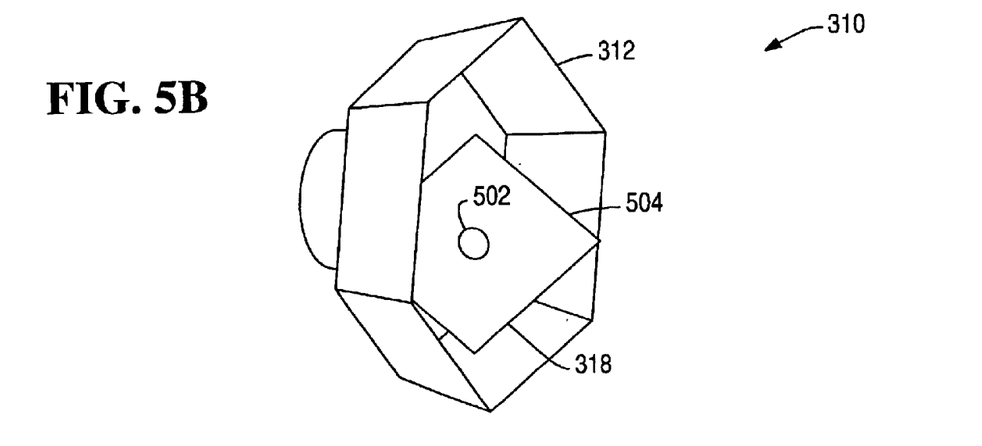
Figure 5C:
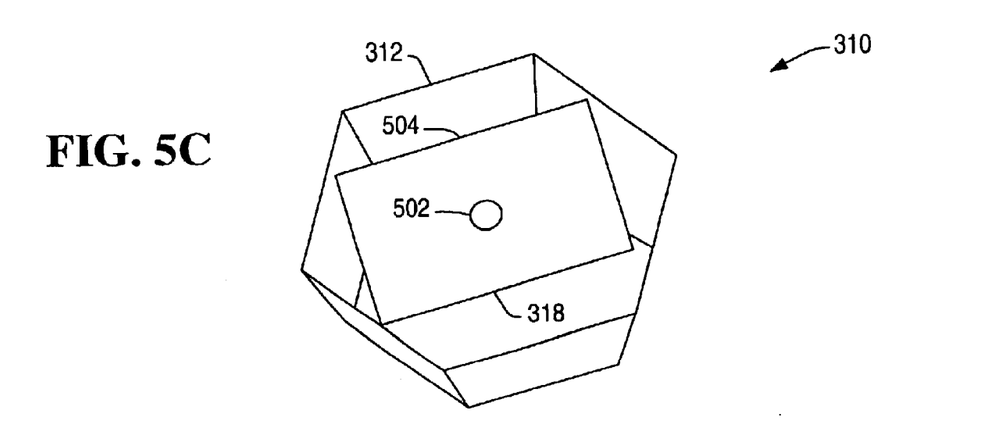
Figure 5D:
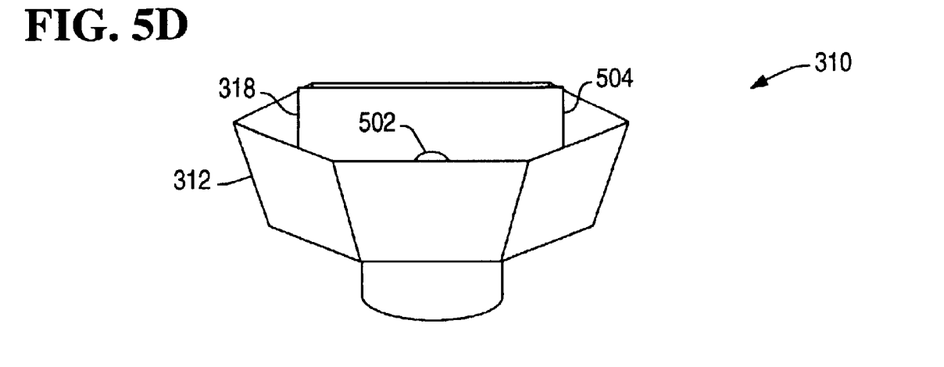
Figure 5E:
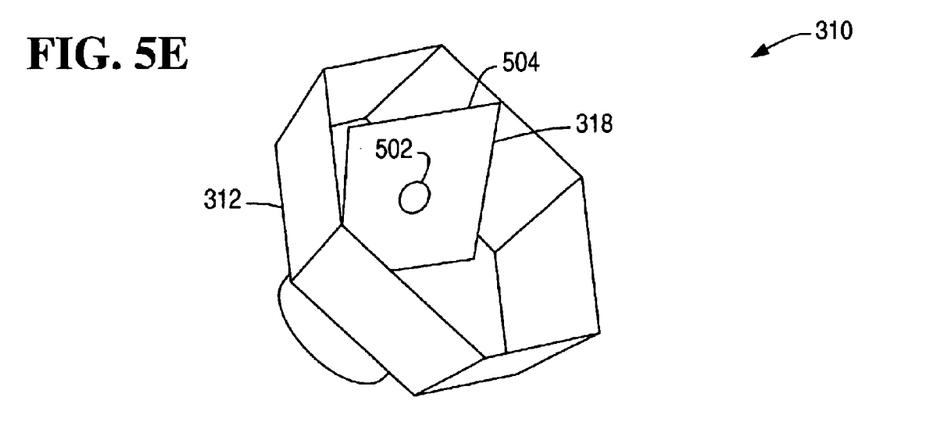
Figure 5F:
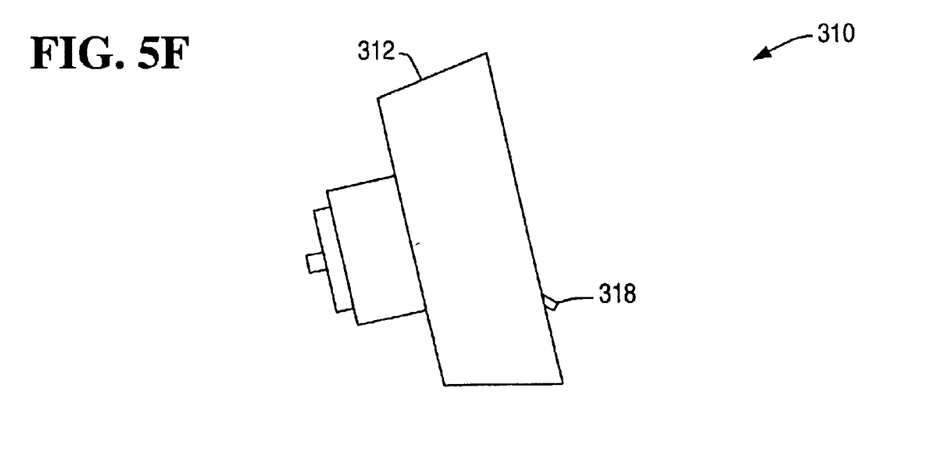

FIGS. 4A and 4B illustrate the increase in scan line length made possible by increases in the optical path length of a scan beam tracing out a scan line. FIG. 4A illustrates a side view of a spinner 402 which may be used in a scanner according to the present invention, with a representation of a scan beam 404 showing the optical path length of the scan beam 404 between the reflection of the scan beam 404 from the spinner 402 and the arrival of the scan beam 404 at a scan window of a scanner. The points 406, 408 and 410 show the total path length so far achieved by the scan beam 404 at first, second and third mirrors within the scanner, respectively. The point 412 shows the path length of the scan beam 404 if it were produced by a prior art scanner similar to the scanner 200 of FIG. 2, having only two mirrors. The point 414 shows the length of the scan beam 404 at the scan window of a scanner having a series of three fixed mirrors, similar to the scanner 300 of FIG. 3.

FIG. 4B illustrates a top view of the spinner 402, showing the length of scan lines swept out by scan beam 404 as a result of the rotation of the spinner 402. The length of a scan line is a function of the angle of rotation traveled by the facet of a spinner reflecting the laser beam to a scan beam and sweep out a scan line through the motion of the scan beam, together with the optical length of the scan beam as it emerges from the scanner. The line 416 shows the length of a scan line that would be achieved at the scan window of a prior art scanner employing only two fixed mirrors for reflection of the scan beam 404, such as the scanner 200 of FIG. 2. The scan line 418 shows the length of a scan line achievable using a scanner such as the scanner 300 of FIG. 3. It can be seen that the possibility of using an additional mirror to produce an increase in path length significantly increases the length of scan line that can be produced.

Providing the ability to generate a scan beam having a longer optical length increases the flexibility of the scan pattern that can be designed. Many spinners used in typical prior art single window scanners, such as the spinner 214 of FIG. 2, have four facets. A scan pattern produced by a scanner using such a spinner may have, for example, 20 scan lines. It is possible to increase the number of scan lines in a scan pattern by using a spinner with more facets. As will be more clearly seen in FIGS. 5A–5F and discussed below, the reflector 312 of FIG. 3 has six facets. Using a spinner with six facets increases the number of scan lines that can be produced. However, if the scan beam has the same optical path length, the use of a spinner with more facets will result in a scan pattern having shorter scan lines. The reason for this is that the length of a scan line is a function of the angle subtended by the facet producing the scan line and the optical length of the scan beam. A facet of a six-facet spinner, for example, subtends a smaller angle than does a facet of a four-facet spinner. If the optical length of the scan beam is the same for each spinner, each scan line produced by the six-facet spinner will be shorter than that produced by the four-facet spinner.

By designing the scanner 300 so as to generate a scan beam having a longer optical path length, it is possible to use a reflector having more facets, such the six-facet reflector 312, to produce a scan pattern having more scan lines, with the scan lines having the same length as those produced by a four-facet spinner with a shorter scan beam. The increased number of scan lines will produce a greater likelihood that a scan line will fall on the bar code at a proper angle for detection, without the sacrifice of light intensity and surface area coverage that would result from a shorter scan line.

FIGS. 5A–5F illustrate various perspective views of the spinner 310 of FIG. 3. The reflector 312 is visible in each figure. A full view of the collector 318 can be seen in FIGS. 5A–5E and a partial view can be seen in FIG. 5F. In FIGS. 5A–5F, a flat portion 502 of the collector 318 is visible, together with an ellipsoidal portion 504. The flat portion 502 of the collector 318 captures the laser beam 309 emitted by the laser 305 and directs it toward the inner surface of the reflector 312 to produce a scan beam. The ellipsoidal portion 504 of the collector 318 captures and focuses reflected light entering the scanner window 302, so as to direct this light to the detector 306 in order to produce a scanner signal.

Figure 6:
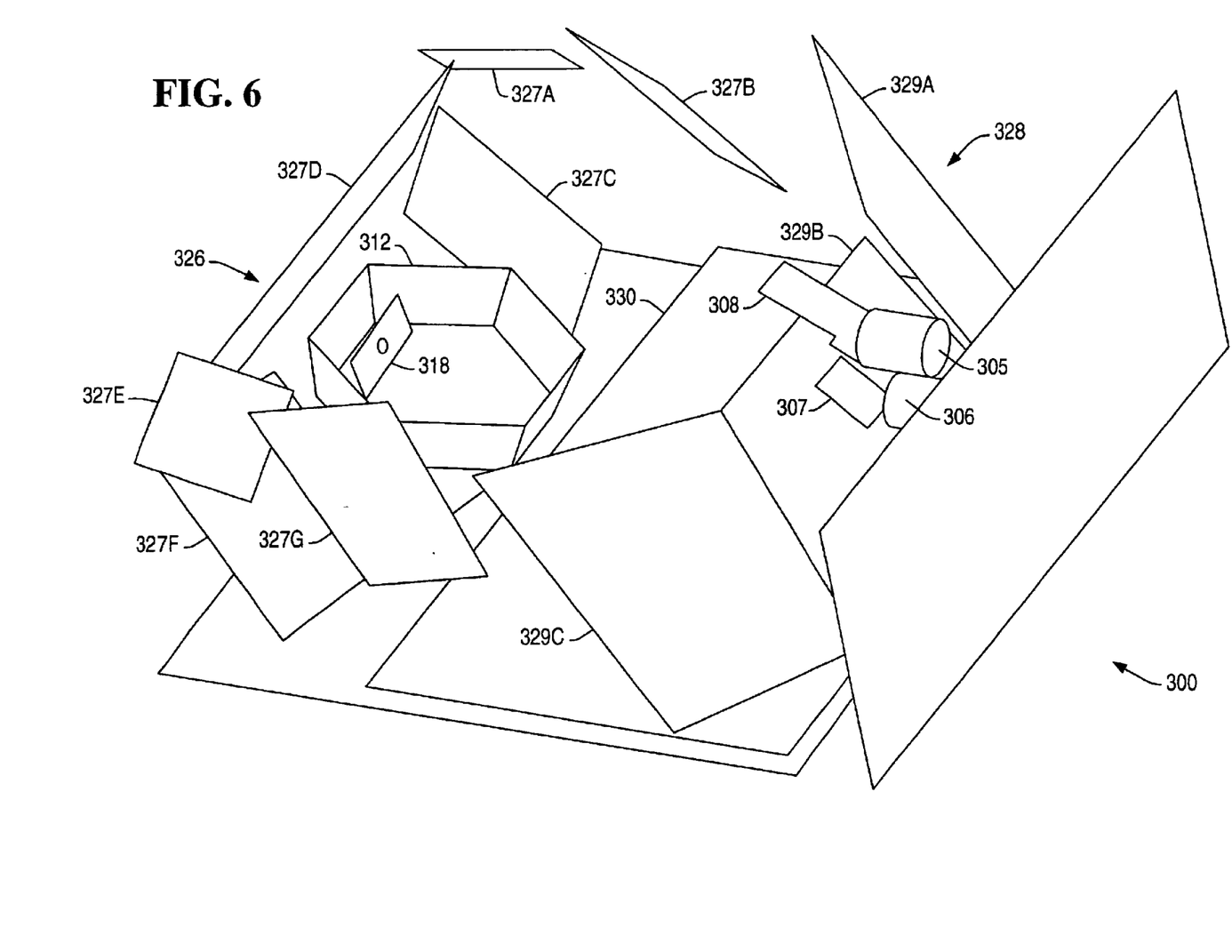
FIG. 6 illustrates an alternative internal view of a single window scanner employing techniques for efficient use of space according to the present invention.

FIG. 6 illustrates a three dimensional perspective view of interior elements of the scanner 300. The laser 305 and the detector 306 can be seen, as well as the deflecting mirrors 307 and 308. Also visible are the spinner 310, including the reflector 312. The collector 318 can be seen to be positioned within the space bounded by the reflector 312, although the arm 320 and the sidewall 322 are omitted for simplicity of illustration.

The sets of mirrors 326 and 328 and the mirror 330 are also visible. The set of mirrors 326 can be seen to be a combination of mirrors 327A–327G and the set of mirrors 328 can be seen to be a combination of mirrors 329A–329C. The multiple mirrors make it possible for a single scan beam to be used to generate multiple scan lines. For example, a scan beam reflected from one facet of the reflector 312 may strike the secondary mirror 327D, the center mirror 329B and the floor mirror 330 in succession before being reflected out the scan window 302 (not seen in this illustration, but visible in FIG. 3). As the scan beam moves across the spinner facet and is reflected from this series of mirrors, it traces out a scan line.

As the spinner facet continues to move, the motion of the reflector 312 causes the scan beam 309 to shift its position so that it is reflected from the secondary mirror 327D, the center mirror 329B and the floor mirror 330. This shift of position occurs while the scan beam is being reflected from the same spinner facet that directed the beam to the secondary mirror 327D. The motion of the scan beam across the new set of mirrors traces out an additional scan line. Thus, one scan beam, that is, a reflection of a laser beam from one facet of the reflector 312 as the reflector 312 rotates, may trace out two or more scan lines as it is shifted from one set of mirrors to another.

The sets of mirrors 326 and 328 occupy a considerable portion of the space available inside the scanner 300. The placement of the collector 318 inside the volume bounded by the reflector 312 frees space for the sets of mirrors 326 and 328, making it possible to provide optical paths scan beams that direct the scan beams through three reflections, and making it possible to provide multiple mirrors in order to allow generation of multiple scan lines from each scan beam.

Figure 7:
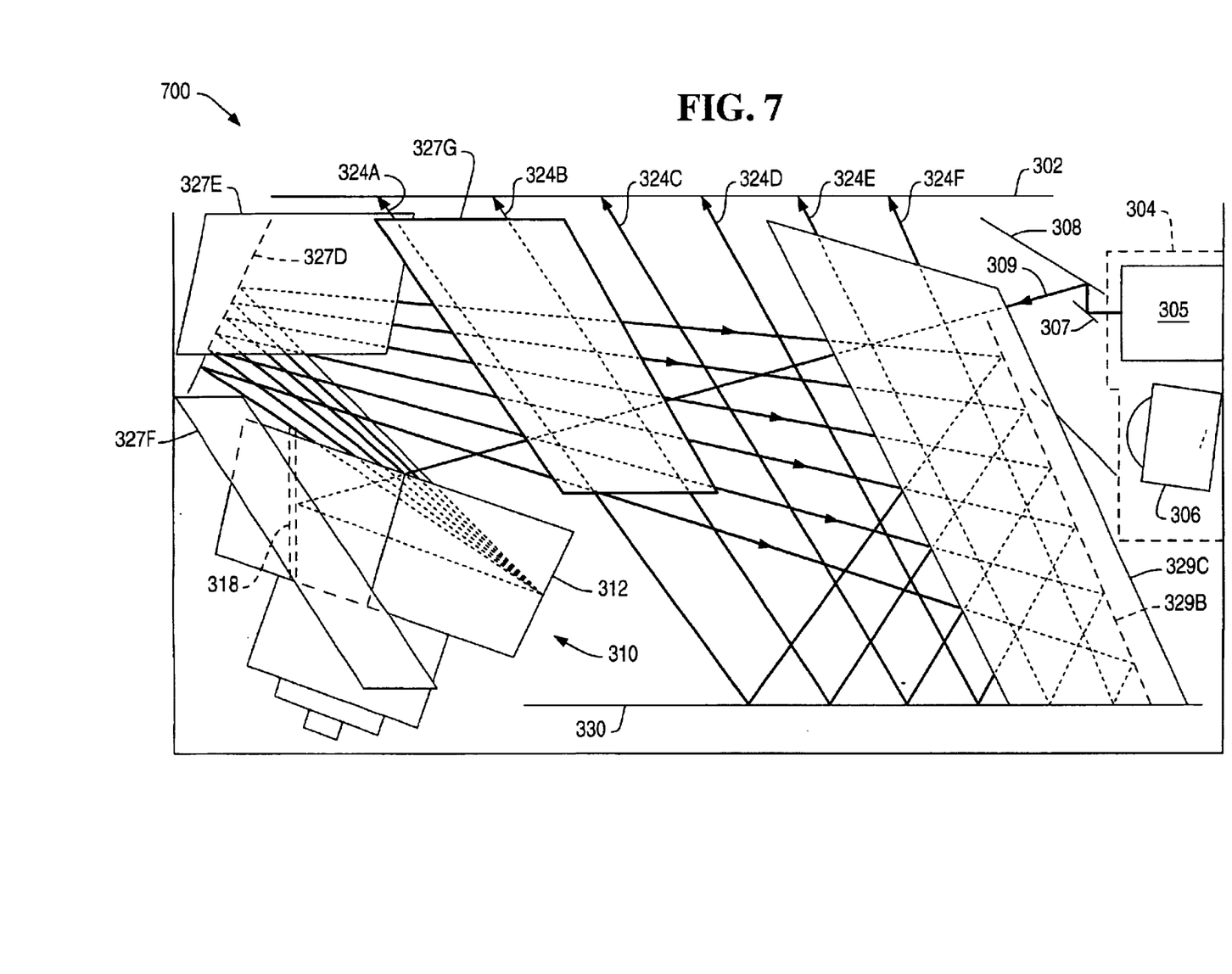
FIG. 7 illustrates a scanner according to the present invention, showing the paths of scan beams generated within the scanner.

FIG. 7 illustrates the scanner 300, showing the outgoing scan lines generated as a result of the reflection of the laser beam 309 from the reflector 312. The laser 305 and the detector 306 can be seen, as well as the deflector mirrors 307 and 308. The spinner 310, the reflector 312 and the collector 318 can also be seen, as well as the fixed mirrors 327D, 327E, 327F, and 327G. The mirrors 327A, 327C and 329A are hidden behind 327E, 327F and 329C respectively due to the symmetry of the layout and the perspective shown), the fixed mirror 329C and the floor mirror 330.

Also visible are the scan beams 324A–324F, each of the scan beams 324A–324F representing a reflection of the laser beam 309 from the reflector 312. As the laser beam 309 enters the volume bounded by the reflector 312, it is reflected by the collector 318 to one of the facets of the reflector 312 to produce a scan bear. As each of the six facets of the reflector 312 moves beneath the laser beam 309, one of the scan beams 324A–324F is generated. The scan beams 324A–324F travel along paths defined by the arrangement of fixed mirrors within the scanner 300, until they are directed to and through the scan window 302.

Figure 8:
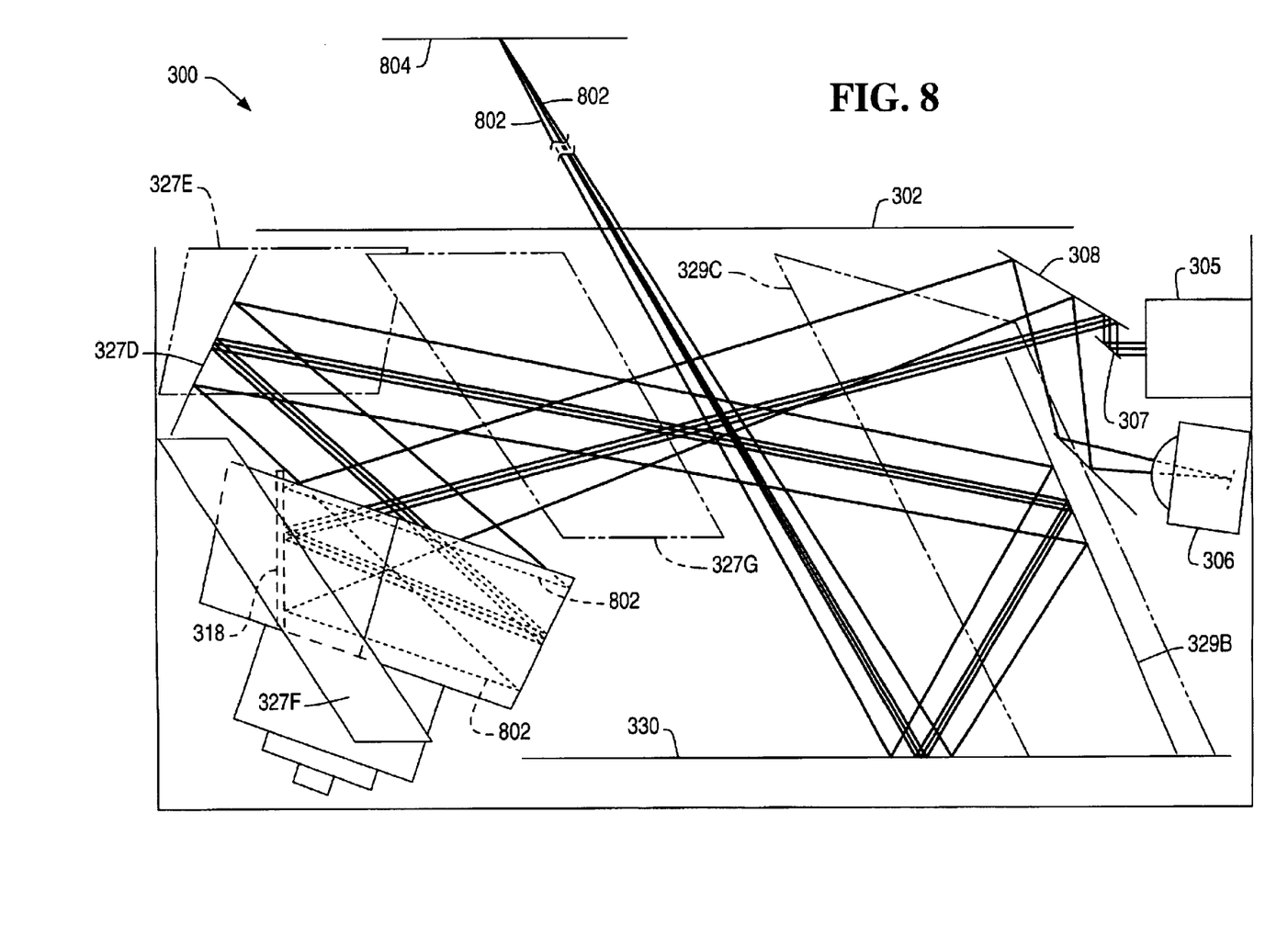
FIG. 8 illustrates a scanner according to the present invention, showing the path of reflected light entering the scanner and directed to a detector within the scanner.

FIG. 8 illustrates the scanner 300, showing the incoming reflected energy beam 802 generated as a result of the reflection of a scan pattern from a bar code 804. The laser 305 and the detector 306 can be seen, as well as the deflector mirrors 307 and 308. The spinner 310, the reflector 312 and the collector 318 can also be seen, as well as the fixed mirrors 327D, 327E, 327F, and 327G, the fixed mirrors 329B, 329C and the floor mirror 330. As the diffuse energy beam 802 enters the scan window 302, it travels to and is reflected from the floor mirror 330, the center mirror 329B and the secondary mirror 327D. The diffuse energy beam then enters the volume defined by the reflector 312, where it is reflected by one or more reflector facets to the collector 318. The elliptical portion 504 of the collector 318, visible in FIGS. 5A–5F, focuses the diffuse energy beam toward the deflector mirrors 308 and 307, where it is sequentially reflected to the detector 306. The detector 306 produces a scan signal, that is, a photo signal responsive to the energy beam 804, which is processed in a conventional way to generate bar code information.

Figure 9:
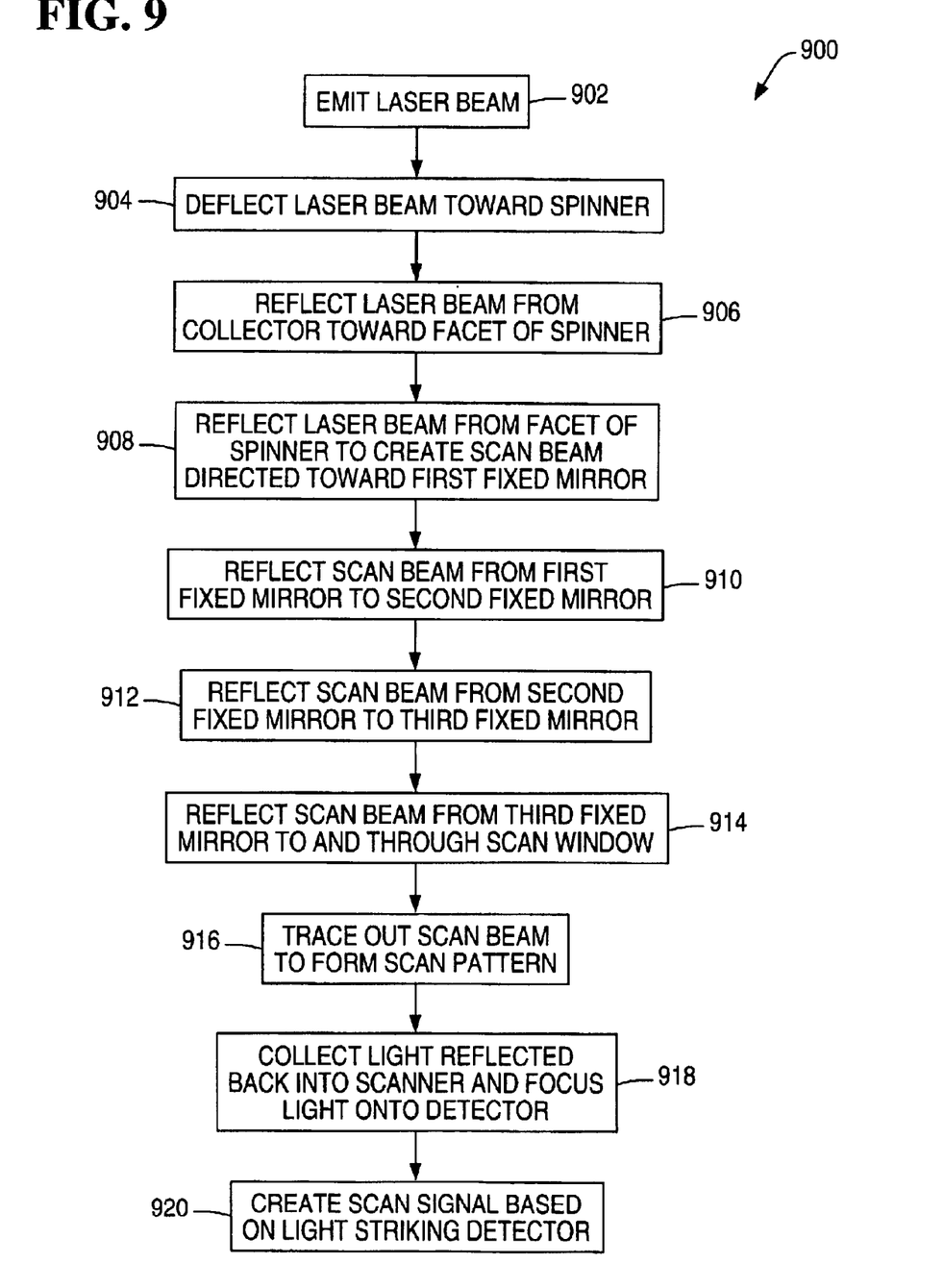
FIG. 9 illustrates a process according to an aspect of the present invention for generating a relatively long scan beam in a single window scanner, moving the scan beam to trace out a scan pattern and detecting reflected light entering the scanner.

FIG. 9 illustrates a process 900 of scan beam generation according to an aspect of the present invention. At step 902, a laser beam is emitted from a laser source within a single window scanner. The scanner may suitably be similar to the scanner 300 of FIG. 3 and may suitably have dimensions similar to those of the scanner 100 of FIGS. 1A and 1B.

At step 904, the laser beam is deflected toward a rotating spinner. The spinner may suitably be similar to the spinner 310 of FIG. 3, and may suitably comprise a hollow polygonal reflector such as the reflector 312. A collector may suitably be located in space enclosed by the reflector. At step 906, the laser beam strikes the collector and is deflected toward a facet of the spinner. At step 908, the laser beam is reflected from the facet of the spinner to create a scan beam. The scan beam is directed toward a first fixed mirror. At step 910, the scan beam is reflected from the first fixed mirror to a second fixed mirror. At step 912, the scan beam is reflected from the second fixed mirror to a third fixed mirror. At step 914, the scan beam is reflected from the third fixed mirror to a scan window and emerges from the scan window. At step 916, as the spinner rotates, the scan beam traces out a path determined by the shapes and arrangement of the spinner and the fixed mirrors to form a scan pattern comprising one or more scan lines. At step 918, as light reflected from a bar code is reflected back into the scanner, the light is collected and focused, and directed to a detector. The collection and focusing of the light may suitably include directing the light to a facet of the spinner and reflecting the light from the spinner facet to the collector, with an element of the collector focusing the light and directing the focused light to the detector. At step 920, the detector produces a scan signal based on the light striking the detector.

While the present invention is disclosed in the context of a presently preferred embodiment, it will be recognized that a wide variety of implementations may be employed by persons of ordinary skill in the art consistent with the above discussion and the claims which follow below.

I claim:

1. A bar code scanner, comprising:
a laser source for generating a laser beam;
a spinner comprising a hollow polygonal reflector having an open side to allow entry of laser light from a laser source and a reflective interior surface within the polygonal reflector, the interior surface comprising a plurality of reflective facets to reflect light entering the polygonal reflector and to direct the reflected light out of the open side into which the laser light entered;
a plurality of fixed mirrors to provide an optical path for a set of scan beams reflected from the facets of the reflective surface of the spinner; and
a collector mirror located within space enclosed by the polygonal reflector.

2. The scanner of claim 1, wherein the collector mirror does not touch the polygonal reflector and is supported by a fixed arm extending from a sidewall of the scanner.

3. The scanner of claim 2, further comprising a plurality of fixed mirrors for receiving a scan beam produced by a reflection of the laser beam from a facet of the reflective surface and reflecting the scan beam to direct the scan beam along a desired optical path, the plurality of fixed mirrors including at least three fixed mirrors so that the scan beam undergoes at least three reflections after leaving the spinner.

4. The scanner of claim 3, wherein the polygonal reflector is hexagonal.

5. The scanner of claim 3, wherein the scanner is a single window scanner.

6. The scanner of claim 3, wherein the plurality of fixed mirrors within the scanner are arranged to allow paths of travel for the scan beam having sufficient cumulative length so that the scan beam has a relatively long total optical length when the scan beam reaches the scan window.

7. The scanner of claim 6, wherein the collector mirror captures and focuses diffuse reflected light entering the scanner as a result of reflection of a scan pattern from a bar code and directs the reflected light to a detector.

8. A spinner for use in a single window scanner, comprising:
- a hollow polygonal reflector having an open side to allow entry of laser light from a laser sources;
- a reflective interior surface within the polygonal reflector, the interior surface comprising a plurality of reflective facets to reflect laser light entering the polygonal reflector and to direct the reflected light out of the open side into which the laser light entered;
- a collector mirror within a volume enclosed by the spinner; and
- a motor connected to the polygonal reflector to spin the polygonal reflector in order to change position and angles of light reflected from facets of the polygonal reflector.

9. The spinner of claim 8, wherein the reflector is hexagonal.

10. A method of scan beam generation in a single window scanner, comprising the steps of:
- generating a laser beam;
- directing the laser beam into an open side of a hollow rotating spinner;
- reflecting the laser beam from an inside surface of the spinner to produce a scan beam emerging from the open side of the spinner into which the laser bean entered; and
- successively reflecting the scan beam from at least three fixed mirrors in order to direct the scan beam along a relatively long optical path;
- moving the scan beam along another path determined by a motion and a shape of the spinner and shapes and arrangement of the fixed mirrors in order to define a scan pattern; and
- collecting and focusing diffuse reflected light generated by a reflection of the scan pattern from a bar code including directing the reflected light from a collector mirror within a volume enclosed by the spinner to a detector.

* * * * *